United States Patent [19]

O'Byrne

[11] Patent Number: 5,105,295
[45] Date of Patent: Apr. 14, 1992

[54] FOUR LEVEL FSK OPTICAL SIGNAL TRANSMISSION WITH OPTICAL DECODING AND DIRECT DETECTION

[75] Inventor: Vincent A. O'Byrne, Boston, Mass.

[73] Assignee: GTE Laboratories Incorporated, Waltham, Mass.

[21] Appl. No.: 460,471

[22] Filed: Jan. 3, 1990

[51] Int. Cl.$^5$ ............................................. H04B 10/00
[52] U.S. Cl. ..................................................... 359/191
[58] Field of Search ..................... 372/23, 25, 28, 20; 455/609-613, 616-619; 370/3

[56] References Cited

U.S. PATENT DOCUMENTS 4,564,946  1/1986  Olsson .................................... 372/20

FOREIGN PATENT DOCUMENTS 0314197  5/1989  European Pat. Off. ............ 455/619
0319242  6/1989  European Pat. Off. ................ 370/3

Primary Examiner—Reinhard J. Eisenzopf
Assistant Examiner—L. Pascal
Attorney, Agent, or Firm—J. Stephen Yeo

[57] ABSTRACT

Apparatus for optical transmission of first and second digital channels. Each digital channel has first and second signal levels. The appparatus has a tunable laser for emitting an optical output at optical frequencies corresponding to current levels. Current responsive to the signal levels of the two channels provides current levels to cause the laser to emit a first optical frequency when the first channel has a second signal level and the second channel has a second signal level, a second optical frequency when the first channel has a first signal level and the second channel has a second signal level, a third optical frequency when the first channel has a first signal level and the second channel has a first signal level, and a fourth optical frequency when the first channel has a second signal level and the second channel has a first signal level. An optical transmission medium is coupled to the output of the laser. A tunable optical filter is coupled to the optical transmission medium. The filter is tuned to pass a pair of adjacent optical frequencies corresponding to a signal level on a selected channel. A baseband detector at the output of the optical filter for provides a mark when either of the pair of optical frequencies passes through the optical filter. The mark is indicative of a signal level on the selected channel.

1 Claim, 3 Drawing Sheets

FOUR LEVEL FSK OPTICAL SIGNAL TRANSMISSION WITH OPTICAL DECODING AND DIRECT DETECTION

CORRESPONDING COPENDING APPLICATIONS

U.S. patent application Ser. No. 07/460,452 filed with this by the same assignee, for FOUR LEVEL FSK OPTICAL SIGNAL TRANSMISSION WITH OPTICAL DECODING AND COHERENT DETECTION, pertains to a system similar to that described herein but using coherent rather than direct detection.

BACKGROUND OF THE INVENTION

The conventional procedure for the transmission of two independent FSK channels is to employ two independent lasers and modulate them individually to obtain two binary channels. The detection scheme can be either optical discrimination or by heterodyne detection. As two lasers are employed, both channels can be effectively on at the same time. Normally the use of one laser to transmit two independent data streams is precluded unless the symbol rate of the laser is increased, or a multilevel signal is transmitted to a complicated receiver.

An object of the invention is to provide apparatus allow transmission of two independent FSK channels by one laser transmitting at the same symbol rate by appropriate coding and reception of one or both such channels by relatively simple direct detection.

SUMMARY OF THE INVENTION

Briefly, apparatus for optical transmission of first and second digital channels. Each digital channel has first and second signal levels. The apparatus has a tunable laser for emitting an optical output at optical frequencies corresponding to current levels. Current means responsive to the signal levels of the two channels provides current levels to cause the laser to emit a first optical frequency when the first channel has a second signal level and the second channel has a first signal level, a second optical frequency when the first channel has a first signal level and the second channel has a second signal level, a third optical frequency when the first channel has a first signal level and the second channel has a first signal level, and a fourth optical frequency when the first channel has a second signal level and the second channel has a first signal level. An optical transmission medium is coupled to the output of the laser. A tunable optical filter is coupled to the optical transmission medium. The filter is tuned to pass a pair of adjacent optical frequencies corresponding to a signal level on a selected channel. A baseband detector at the output of the optical filter for provides a mark when either of the pair of optical frequencies passes through the optical filter. The mark is indicative of a signal level on the selected channel.

DETAILED DESCRIPTION OF THE INVENTION

Figure 1:
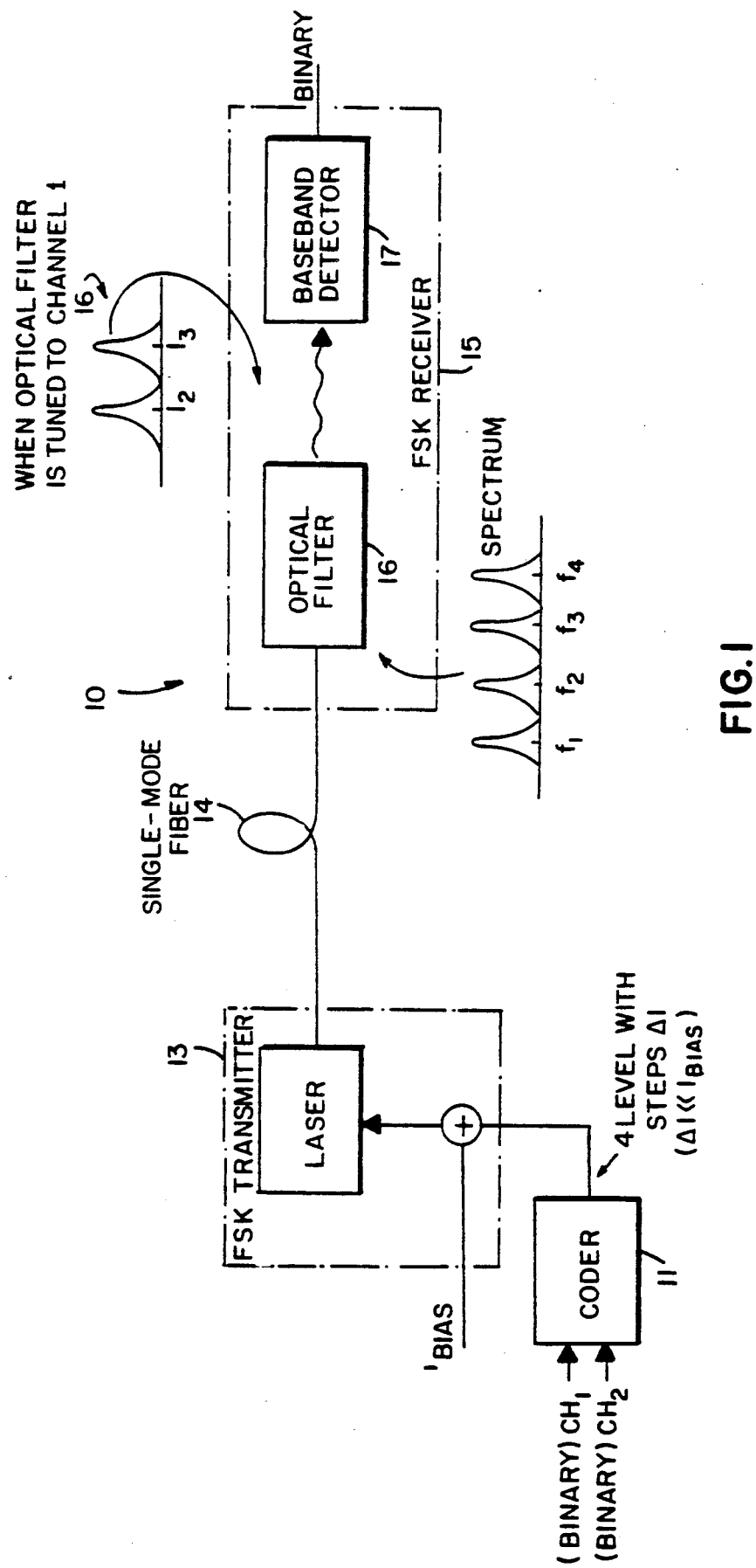
FIG. 1 is a block diagram of a system embodying the invention.

FIG. 1 is a block diagram of a system embodying the invention. The system codes a transmitted 4-level Frequency Shift Keyed (FSK) signal so that an optical filter can be employed to optically decode the 4 level signal, producing a binary output signal. The binary optical output is then direct detected in the same manner as conventional direct detection FSK systems. Direct detection FSK has advantages over other systems (e.g., ease of transmission, baseband detection, insensitive to input polarization, compact optical spectrum, etc.).

The optical transmission system employs four level frequency shift keying (FSK) combined with a tunable optical filter configuration at the receiver to allow transmission of two independent digital signals by a single diode laser transmitter. This arrangement uses one-half the number of diode lasers normally required by a FSK system with the further advantage of a relatively simple direct detection receiver.

As channels are coded in pairs, the total power transmitted in the multichannel system is halved. However, a subscriber tuned to a particular channel will see the same power as if both channels were transmitted independently.

Figure 2A:
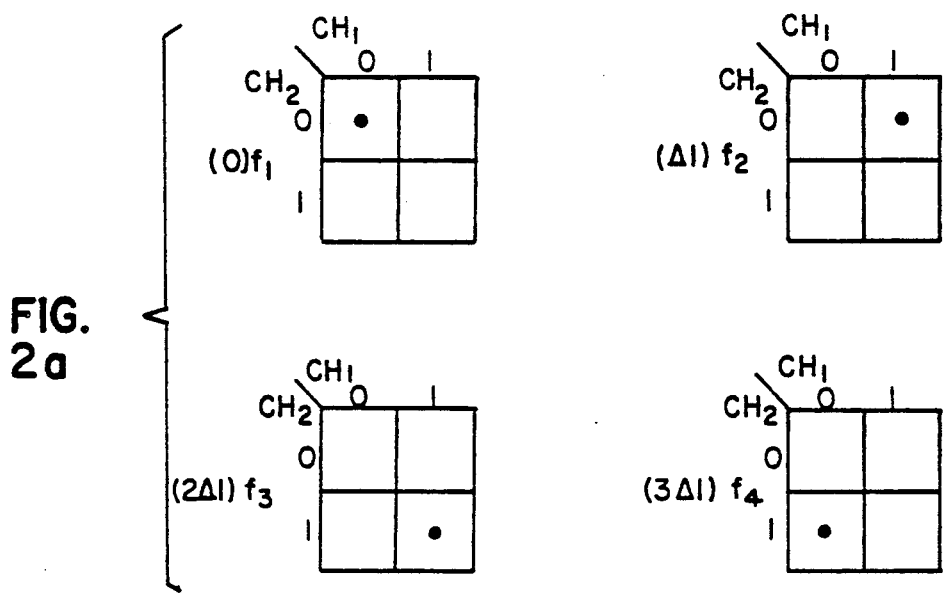
FIG. 2A-B shows, current outputs of a coder used in the system of FIG. 1.

Referring to FIG. 1, the two digital channels ($C_1$ and $C_2$) to be transmitted are passed through coder 11 which converts the two binary channels into one output of 4 laser drive current levels. The coder 11 employs an algorithm, seen in FIG. 2a, which assigns increasing or decreasing current levels to the output as the inputs vary in a fashion similar to a Gray code. The current output of coder 11 modulates bias current of transmitter laser 12 of FSK transmitter 13 and produces an FSK signal whose frequency corresponds to current variations. According to the algorithm zero current is output when a space (one of two signal levels) is present on both channels. The FSK frequency varies in proportion to the impressed current variations ($\Delta I$). The output increases to $\Delta I$ when a mark (the other of two signal levels) is present on channel one alone. When a mark is present on both channels then the output is set to $2\Delta I$. For a mark present on the channel two input and a space on the channel one input then the output is set to $3\Delta I$. Thus as the inputs change according to the Gray code, the current output increases in a staircase fashion. Alternatives and variations of this code may be used.

Figure 2B:
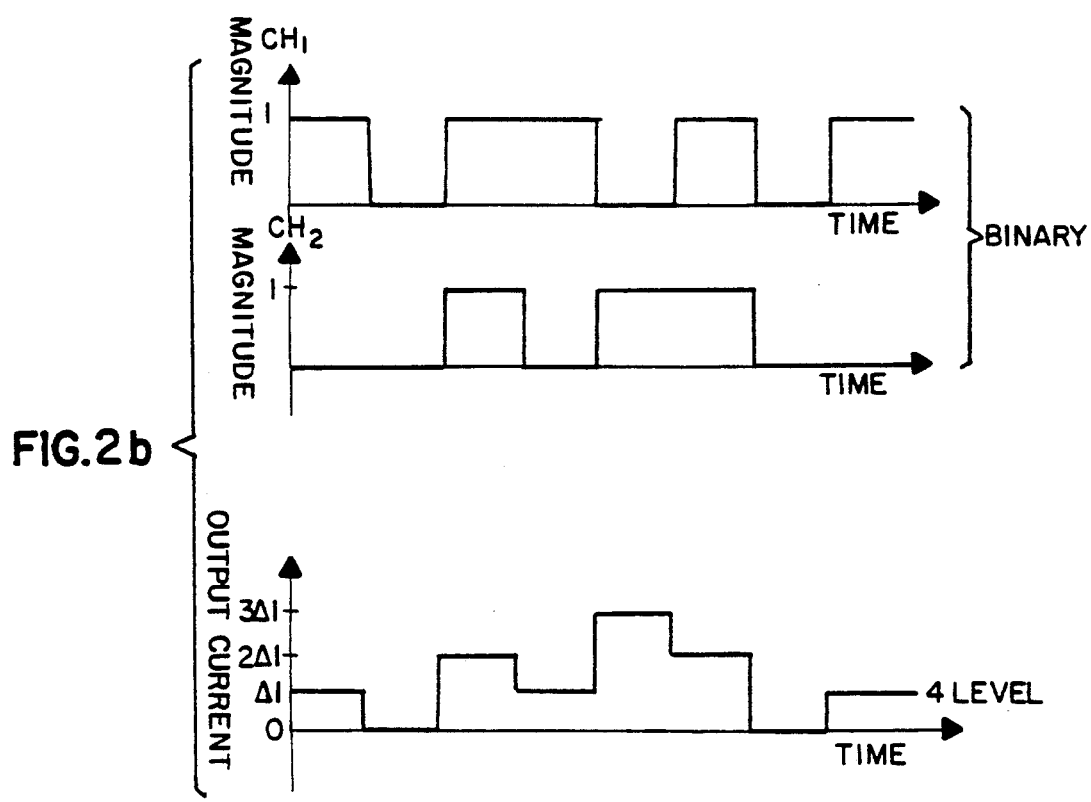

The coder is responsive to the signal levels of the two channels and provides current levels to cause laser 12 to emit a first optical frequency when the first channel has a second signal level and the second channel has a second signal level, a second optical frequency when the first channel has a first signal level and the second channel has a second signal level, a third optical frequency when the first channel has a first signal level and the second channel has a first signal level, and a fourth optical frequency when the first channel has a second signal level and the second channel has a first signal level. A sample sequence of the current output for various input sequences is shown in FIG. 2b.

Returning to FIG. 1, the FSK signal from transmitter 13 traverses optical channel 14 to receiver 15. At the receiver 15, the FSK signal is converted by a tunable optical filter 16 into the desired channel, according to which group of frequencies are passed and which are rejected. This is then detected by a baseband detector 17 such as a PIN-FET or APD.

Figure 3:
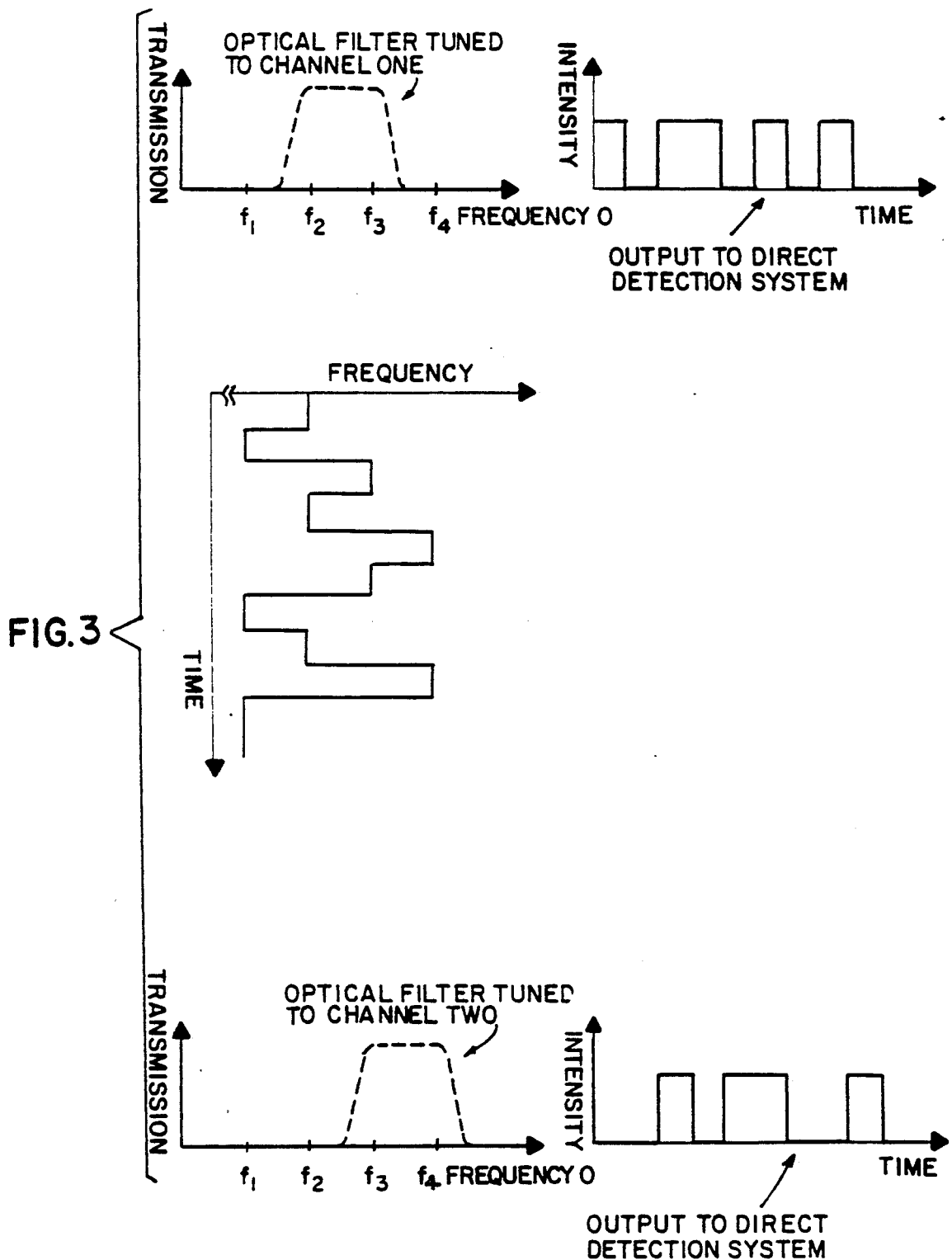
FIG. 3 shows outputs of an optical filter used in the system of FIG. 1.

The tunable optical filter 16 passes two of the four transmitted frequencies selected according to the channel to be received. Frequencies $f_2$ or $f_3$, when present, pass through the filter when it is tuned to channel one and $f_3$ or $f_4$ when it is tuned to channel two. The frequency separation between any two frequencies is chosen such that the two required frequency positions {$f_2(f_4)$ and $f_3$ for channel 1(2)} covered by the passband of the optical filter and that the other frequencies when transmitted are heavily attenuated. This is illustrated in FIG. 3 where the top trace represents the output of the optical filter when tuned to channel 1, and the lower trace represents the output of the optical filter when tuned to channel 2, for the 4 level FSK signal generated by the transmitter laser.

As the separation of the transmitted frequencies are of the same order as the 3dB bandwidth of the optical filter 16 the filter's output is essentially binary. Detector 17 provides a "Mark" when the optical filter is tuned to channel 1(2) and $f_2(f_4)$ or $f_3$ is received.

The described system requires an optical filter to sufficiently attenuate $f_4(f_2)$ and $f_1$ when tuned to channel 1(2). If optical filter 16 is a single Fabry-Perot filter, there may be a power penalty. However, two cascaded Fabry-Perot filters gives a sharp characteristic and by detuning two cascaded Fabry-Perot filters there is obtained a flattened characteristic over the central region of the filter. For example, by considering identical Fabry-Perot filters detuned by $\Delta v_{\frac{1}{4}}$ from the center of the cascaded filter passband and spacing the four frequencies by $\Delta v_{\frac{1}{4}}$ intervals the attenuation of $f_1$ and $f_4(f_2)$, relative to the desired signal, is greater than 12dB when tuned to channel 1(2).

As the attenuation encountered by the desired frequencies upon filtering by the optical filter 16 may be large, approximately 7dB for if implemented by cascaded Fabry-Perot filters, an optical amplifier may be used prior to filtering.

By following the invention, the number of transmitting lasers are decreased by fifty-percent as compared with conventional multichannel FSK systems as two channels are sent by every laser. The symbol rate is the same when both channels are synchronized. Thus as there is no increase in the symbol rate the required receiver power is the same as in optical discriminator detection of FSK. For closely spaced Frequency Division Multiplexed (FDM) systems the arrangement cuts down on the electronics necessary to stabilize all the channels to a reference source by half.

In the system, there is only one frequency transmitted out of a possible four frequencies as compared with one in two frequencies in conventional multichannel binary FSK. Thus, with sharp optical filtering, the crosstalk characteristics are expected to be better for the disclosed system than that for multichannel binary FSK systems.

The concept of appropriately coding two binary channels into one 4 level FSK signal, at the same symbol rate, so it can be optically decoded by the suitable positioning of an optical filter is novel. Modifications and variations of the described system will now be apparent to those skilled in the art. Accordingly the invention is defined by the following claims.

What is claimed is:

1. Apparatus for optical transmission of first and second first and second signal levels, said apparatus comprising:

a tunable laser for emitting an optical output at optical frequencies corresponding to current levels;

current means responsive to the signal levels of said first and second channels for providing current levels to cause said laser to to emit a first optical frequency when said first channel has a second signal level and said second channel has a second signal level, a second optical frequency when said first channel has a first signal level and said second channel has a second signal level, a third optical frequency when said first channel has a first signal level and said second channel has a first signal level, and a fourth optical frequency when said first channel has a second signal level and said second channel has a first signal level;

an optical transmission medium coupled to the output of said laser;

a tunable optical filter coupled to said optical transmission medium, said filter tuned to pass a pair of adjacent optical frequencies corresponding to a signal level on a selected channel; and a baseband detector at the output of said optical filter for providing a mark when either of the pair of optical frequencies passes through said optical filter, said mark indicative of said signal level on the selected channel.

* * * * *